United States Patent
Hill et al.

(10) Patent No.: US 9,447,550 B2
(45) Date of Patent: *Sep. 20, 2016

(54) ENHANCED CONTROL OF CONSTRUCTION EQUIPMENT

(71) Applicant: Caterpillar Trimble Control Technologies LLC, Dayton, OH (US)

(72) Inventors: Jason Grier Lindsay Hill, Superior, CO (US); Helen C. Cutler, Little River (NZ); Stephen A. Miller, Dayton, OH (US); Chad C. Apple, Troy, OH (US); James Robert McKaskill, Broomfield, CO (US); Alan Sharp, Superior, CO (US)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/065,187

(22) Filed: Mar. 9, 2016

(65) Prior Publication Data

US 2016/0186388 A1    Jun. 30, 2016

Related U.S. Application Data

(63) Continuation of application No. 14/225,706, filed on Mar. 26, 2014, now Pat. No. 9,309,631.

(51) Int. Cl.
| | |
|---|---|
| *E01C 19/00* | (2006.01) |
| *E01C 19/42* | (2006.01) |
| *E02F 9/20* | (2006.01) |
| *E02F 3/84* | (2006.01) |
| *E02F 9/26* | (2006.01) |
| *G01C 15/00* | (2006.01) |
| *G01S 13/87* | (2006.01) |

(52) U.S. Cl.
CPC ............. *E01C 19/004* (2013.01); *E01C 19/42* (2013.01); *E02F 3/847* (2013.01); *E02F 9/205* (2013.01); *E02F 9/262* (2013.01); *E02F 9/265* (2013.01); *G01C 15/00* (2013.01); *G01S 13/878* (2013.01)

(58) Field of Classification Search
CPC ...... E01C 19/004; E01C 19/42; E02F 9/205; G01C 9/205; G01C 3/847; G01C 9/262; G01C 9/265; G01S 13/878
See application file for complete search history.

(56) References Cited

U.S. PATENT DOCUMENTS

| | | | |
|---|---|---|---|
| 5,483,457 A | 1/1996 | Shibata et al. | |
| 5,549,412 A | 8/1996 | Malone | |
| 6,424,914 B1 | 7/2002 | Lin | |
| 6,450,267 B2 * | 9/2002 | Ohtomo | E02F 3/842 |
| | | | 172/4.5 |

(Continued)

OTHER PUBLICATIONS

U.S. Appl. No. 14/225,702, NonFinal Office Action dated Dec. 10, 2015; 45 pages.

(Continued)

*Primary Examiner* — Mussa A Shaawat
*Assistant Examiner* — Thomas Ingram
(74) *Attorney, Agent, or Firm* — Swanson & Bratschun, L.L.C.

(57) ABSTRACT

Novel tools and techniques for controlling heavy equipment vehicles, such as tractors, graders, road-forming machines, and the like. Some techniques allow a control system of a heavy equipment vehicle to transition from receiving position data from one positioning device to receiving data from another without ceasing operation and/or while limiting any resulting discontinuity in a manipulated ground surface to within acceptable tolerances.

23 Claims, 6 Drawing Sheets

(56) References Cited

U.S. PATENT DOCUMENTS

| | | |
|---|---|---|
| 7,191,254 B2 | 3/2007 | Yamada et al. |
| 7,307,710 B2 * | 12/2007 | Gatsios ............... G01C 15/00 356/139.01 |
| 7,423,742 B2 | 9/2008 | Gatsios et al. |
| 8,494,561 B2 | 7/2013 | Berg |
| 9,309,631 B2 | 4/2016 | Hill et al. |
| 2002/0015439 A1 | 2/2002 | Kohli et al. |
| 2002/0126044 A1 | 9/2002 | Gustafson et al. |
| 2007/0205941 A1 | 9/2007 | Riley et al. |
| 2008/0047170 A1 | 2/2008 | Nichols |
| 2008/0060825 A1 | 3/2008 | Unruh et al. |
| 2008/0088507 A1 | 4/2008 | Smith et al. |
| 2008/0208461 A1 | 8/2008 | Gharsalli et al. |
| 2008/0279421 A1 | 11/2008 | Hamza et al. |
| 2009/0093959 A1 | 4/2009 | Scherzinger et al. |
| 2009/0287414 A1 | 11/2009 | Vickery |
| 2009/0315772 A1 | 12/2009 | Wengler et al. |
| 2010/0070178 A1 | 3/2010 | Wang et al. |
| 2010/0103041 A1 | 4/2010 | Tomita |
| 2010/0117894 A1 | 5/2010 | Velde et al. |
| 2010/0194634 A1 | 8/2010 | Biacs et al. |
| 2011/0148695 A1 | 6/2011 | Mizuochi |
| 2012/0215381 A1 | 8/2012 | Wang et al. |
| 2012/0246977 A1 | 10/2012 | Proeber et al. |
| 2012/0259543 A1 | 10/2012 | Shirai |
| 2013/0006484 A1 * | 1/2013 | Avitzur ............... E02F 9/205 701/50 |
| 2013/0261908 A1 * | 10/2013 | Jang ............... E02F 9/2079 701/53 |
| 2014/0107883 A1 * | 4/2014 | Fritz ............... G05D 1/0278 701/25 |
| 2014/0214317 A1 | 7/2014 | Sanjay et al. |
| 2015/0274157 A1 | 10/2015 | Sharp |

OTHER PUBLICATIONS

U.S. Appl. No. 14/225,702, Final Office Action dated Mar. 25, 2016; 43 pages.

U.S. Appl. No. 14/225,706, Notice of Allowance mailed Dec. 4, 2015; 20 pages.

* cited by examiner

ENHANCED CONTROL OF CONSTRUCTION EQUIPMENT

CROSS-REFERENCE TO RELATED APPLICATIONS

This application is a continuation of U.S. application Ser. No. 14/225,706, filed Mar. 26, 2014, by Jason Grier Lindsay Hill, et al. and titled, "Enhanced Control of Road Construction Equipment," which is hereby incorporated by reference in its entirety.

This application may be related to U.S. application Ser. No. 14/225,702, filed on Mar. 26, 2014, by Alan Sharp titled "Blended Position Solutions" and assigned to Trimble Navigation, Limited (the "Blended Solutions Application"), the entire disclosure of which is incorporated by reference herein.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to road construction, and more particularly, to enhanced control systems that can employ multiple positioning devices for control of equipment.

BACKGROUND

A variety of different machines are used in the construction of roads and other infrastructure. Such machines (referred to collectively herein as "road-forming machines") can include, without limitation, equipment that displaces, shapes, and/or forms the underlying roadbed, such as earthmovers, motor graders and the like. Road-forming machines can also include machines that deposit and/or form the actual roadway material, such as asphalt pavers, which deposit asphalt on a road surface, slipform pavers, which extrude or otherwise shape concrete on a road surface, and/or the like. Such road-forming machines are commonly controlled by advanced control systems that use high-precision positioning equipment to ensure that the machines shape the earth and/or the road surface consistent with an engineer's model for the project.

In some cases, such machines might include onboard positioning equipment, such as a global navigation satellite system ("GNSS") receiver. Generally, however, such receivers do not provide the level of precision necessary for these types of projects. As a result, many such systems employ external positioning devices, such as total stations (of which many are commercially available from Trimble Navigation) to provide precise positioning information to the machine's control system. The use of such external devices, while providing precise positioning information, is not problem-free. For example, in many cases, a total station (or other positioning device) will need to be moved from one location to another, in order to continue to provide valid positioning information to the road-forming machine as the machine moves along the path of a road. Typically, the machine will have to cease operation while the positioning device is moved and calibrated at the new location. This interruption greatly reduces the efficiency of the construction operation, adding time and expense to the project. This inefficiency can be mitigated somewhat through the use of multiple positioning devices, but the inability of a control system to receive input from more than one device simultaneously means that the machine will still have to cease operation while it transitions from one positioning device to another.

Further, every time the positioning device is moved in such projects, or a control system switches from one positioning device to another, any error in the data received from either device can introduce a discontinuity in the road surface. Such errors can result from imprecision of the calibration of positioning devices, thermal effects (which can cause minor distortion of lasers used to determine the machine's position by the positioning devices), wind and other environmental effects, and the like. Continuity of the road surface is often of primary importance (to whatever degree of precision is appropriate, depending on the step in the process). Merely by way of example, in many cases, there is a relatively large degree of freedom in variance from the model of the project, so that a road surface a few centimeters higher lower than the elevation specified by the model is acceptable. On the other hand, a discontinuity of even a centimeter in the surface of a road can create significant issues (the least of which is a severe bump for any cars that travel the road). Hence, conventional systems further degrade efficiency by requiring additional processes to prevent or remedy such discontinuities.

Accordingly, there is a need for control systems for road-forming machines that provide more robust positioning control.

BRIEF SUMMARY

Certain embodiments provide improved tools and techniques for controlling road-forming machines. In an aspect of particular embodiments, these tools allow a control system of a road-forming machine to transition from receiving position data from one positioning device to receiving data from another without ceasing operation and/or while limiting any resulting discontinuity in the formed road surface to within acceptable tolerances. The tools provided by various embodiments include, without limitation, road-forming machines, methods, computers and control systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, a road-forming machine (which might be a paving machine, such as a concrete paver, asphalt paver, slip-form paver, and/or the like; milling machine; motor grader; scraper; or any other machine capable of forming a road surface and/or the earth on which a road surface will be built) in accordance with one set of embodiments might comprise a locomotion system configured to move the road-forming machine, which can include, without limitation, wheels and/or tracks, as well as the apparatus for providing power and/or steering input to such wheels and/or tracks. The road-forming machine might also comprise a road-forming system configured to form a road surface continuously as the road-forming machine moves; the road-forming system might include, without limitation, a grader blade, a paving system, and/or the like.

In some cases, the road-forming machine might comprise a communication interface to provide communication with a plurality of position measurement devices and/or a control system comprising a processor, a non-transitory storage medium, and a set of instructions executable by the processor. Such instructions can include, without limitation, instructions to cause the road-forming machine to implement methods provided by other embodiments. Merely by way of example, in some embodiments, the set of instructions might comprise instructions to receive position data from one or more position measurement devices, including a first position measurement device and a second position measurement device. The set of instructions might further comprise instructions to control operation of the road-forming system, for example, based on determined positions of the road-forming system and a model stored on the non-transitory storage medium.

There might be further instructions to determine a first position of the road-forming system based on position data received from the first position measurement device, instructions to transition from the first position measurement device to the second position measurement device, and/or instructions to determine a second position of the road-forming system based on position data received from the second position measurement device. In some cases, the transition from the first position measurement device to the second position measurement device can be accomplished without interrupting movement of the road-forming machine or formation of the road surface and/or without introducing a discontinuity in the formed road surface greater than a specified threshold value.

Another set of embodiments provides computer systems, including without limitation control systems for road-forming machines. One exemplary control system might comprise one or more processors and a non-transitory computer readable medium in communication with the one or more processors. A further set of embodiments provides apparatus, which can include without limitation, a non-transitory computer readable medium having encoded thereon instructions for programming such a control system. In either case, the computer readable medium having encoded thereon a set of instructions executable by the computer system to perform one or more operations, including without limitation operations consistent with methods provided by various embodiments.

An exemplary set of instructions might comprise instructions to receive position data from two or more position measurement devices, including a first position measurement device and a second position measurement device. The set of instructions could further include instructions to control operation of a locomotion system of the road-forming machine and a road-forming system of the road-forming machine to form a road surface continuously, e.g., based on determined positions of the road-forming system and a model stored on the non-transitory computer readable medium. The set of instructions might also include instructions to determine a first position of the road-forming system based on position data received from the first position measurement device, instructions to transition from the first position measurement device to the second position measurement device, and/or instructions to determine a second position of the road-forming system based on position data received from the second position measurement device. In some cases, this transition can be performed without interrupting movement of the road-forming machine or formation of the road surface, and/or without introducing a discontinuity in the road surface greater than a specified threshold value.

Yet another set of embodiments provides methods. One exemplary method might comprise forming a road surface with a road-forming machine, such as those described herein. Merely by way of example, a road-forming machine might comprise a locomotion system configured to move the road-forming machine, a road-forming system configured to form a road surface continually as the road-forming machine moves, a communication interface to provide communication with a plurality of position measurement devices, and/or a control system configured to control operation of the road-forming machine.

The method, then, might comprise receiving, e.g., with the control system, position data from two or more position measurement devices, including a first position measurement device and a second position measurement device. In some cases, the method further comprises controlling, with the control system, operation of the locomotion system and the road-forming system, for example, based on determined positions of the road-forming system and a model stored on the non-transitory storage medium. In particular embodiments, the method can include determining, with the control system, a first position of the road-forming system based on position data received from the first position measurement device; transitioning, with the control system, from the first position measurement device to the second position measurement device; and/or determining a second position of the road-forming system based on position data received from the second position measurement device. In a particular aspect, the transitioning operation can occur without interrupting movement of the road-forming machine or formation of the road surface and without introducing a discontinuity in the formed road surface greater than a specified threshold value.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Figure 1:
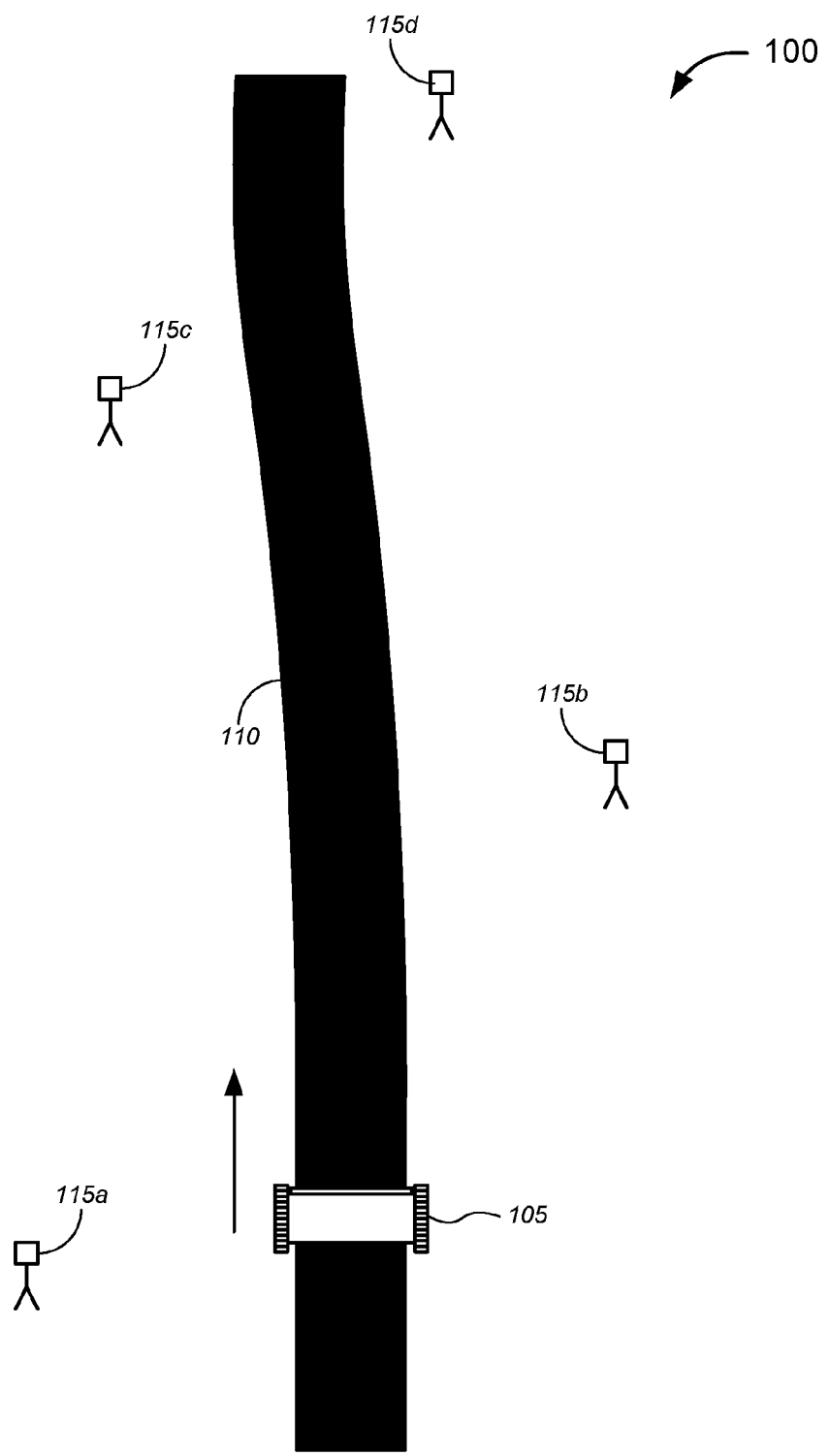
FIG. 1 illustrates a system for providing positioning information to a road-forming machine, in accordance with various embodiments.

Certain embodiments provide improved tools and techniques for controlling road-forming machines. In an aspect of particular embodiments, these tools allow a control system of a road-forming machine to transition from one positioning device to another without ceasing operation and while limiting any resulting discontinuity to within acceptable tolerances. For example, FIG. 1 (which is not drawn to scale) illustrates a system 100 for providing position information to a road-forming machine 105. As noted above, such road-forming machines 105 can include any number of machines or vehicles, such as, without limitation, equipment that displaces, shapes, and/or forms the underlying roadbed, such as earthmovers, milling machines, motor graders, and the like, as well as machines that deposit and/or form the actual roadway material, such as asphalt pavers, which deposit asphalt on a road surface, concrete pavers, slipform pavers, which extrude or otherwise shape concrete on a road surface, and/or the like. In the example illustrated by FIG. 1, the road-forming machine 105 might be an asphalt paver that deposits asphalt on an existing surface of a road 110 to improve that surface.

Typically, most road-forming operations (whether creating the underbed or applying the road surface) are designed using advanced modeling software, such as the Trimble Office™ package commercially available from Trimble Navigation Ltd. Using such software, an engineer can create a model for the road that accounts for the topography of the area, any technical or regulatory constraints (such as maximum allowable grade, and the like), and any other design features of the project. Such models generally are oriented to a local or (more likely) global coordinate system, such as latitude/longitude/elevation. The road 110, then, is formed consistently with this model, to whatever degree of precision is required.

To ensure consistency between the formed road 110 and the design model, the location of the road-forming machine 105 relative to the coordinate system in use must be carefully managed. There are several techniques for managing the location of the machine 105. For example, the control system of the machine 105 itself might include a global navigation satellite system ("GNSS") receiver. Generally, however, an onboard GNSS receiver does not provide the precision necessary to conform sufficiently to the established model for the road 110. Accordingly, an accepted practice is to track the position of the machine 105 with one or more high-precision position measurement devices 115 (also referred to herein as "positioning devices"). Such position measurement devices 115 can include, without limitation, total stations such as those available from Trimble Navigation Ltd., rovers such as those disclosed in U.S. Pre Grant Pub. No. 2012-0166137-A1, the descriptions of which are incorporated herein by reference, or any other device capable of providing an external reference of the machine's 105 position. Such a position measurement device, e.g., 115a, after determining the position of the machine 105 (through whatever technique) can then communicate that position information to the control system of the machine 105.

A variety of techniques are available for a position measurement device 115 to communicate position information to the machine 105. In some cases, standard communication interfaces, such as IEEE 802.11x (WiFi) radios or cellular radios, might be installed in the position measurement device 115 and the control system of the machine 105. In other cases, proprietary single- or multi-channel radios might provide such communication. In any case, the position measurement device 115 provides position information to a control system (which might be located, but need not necessarily be located on the machine 105), which determines the position of the machine 105 based on the position information received from a position measurement device, such as device 115a.

As the machine 105 moves along the road, however, the position solution provided by a particular position measurement device 115a might degrade, because of the distance between the machine 105 and the device 115a, obscured sightlines between the machine 105 and the device 115a, or various other factors. Accordingly, the machine will need to obtain position information from a different position measurement device, e.g., 115b (which can be a different device from the device 115a or can be the same device moved to a different station). This process can continue, using devices 115c and 115d in sequence as the machine moves down the road 110. In a particular aspect, two (or more) devices might be used in a leapfrog fashion, such that a single position measurement device might serve as device 115a and device 115c, while another position measurement device might as device 115b and device 115d.

Conventionally, the transition from obtaining position information from one device 115 to obtaining position information from another device 115 (or from the same device 115 at a different station) requires the machine 105 to be stopped and recalibrated. Further, because of minor error in the position solutions provided by one or the other (or both) of the devices 115, the calculated position of the machine 105 might experience a discontinuity during the transition. As noted above, both the need to cease operations and the potential for discontinuity can present problems for the project. Various embodiments, as described in further detail below, can avoid these problems by allowing the machine 105 to transition from one position measurement device (e.g., 115a) to another device (e.g., 115b) without ceasing operation and while maintaining continuity (to within a specified precision) in the calculation of the position of the machine 105.

Figure 2:
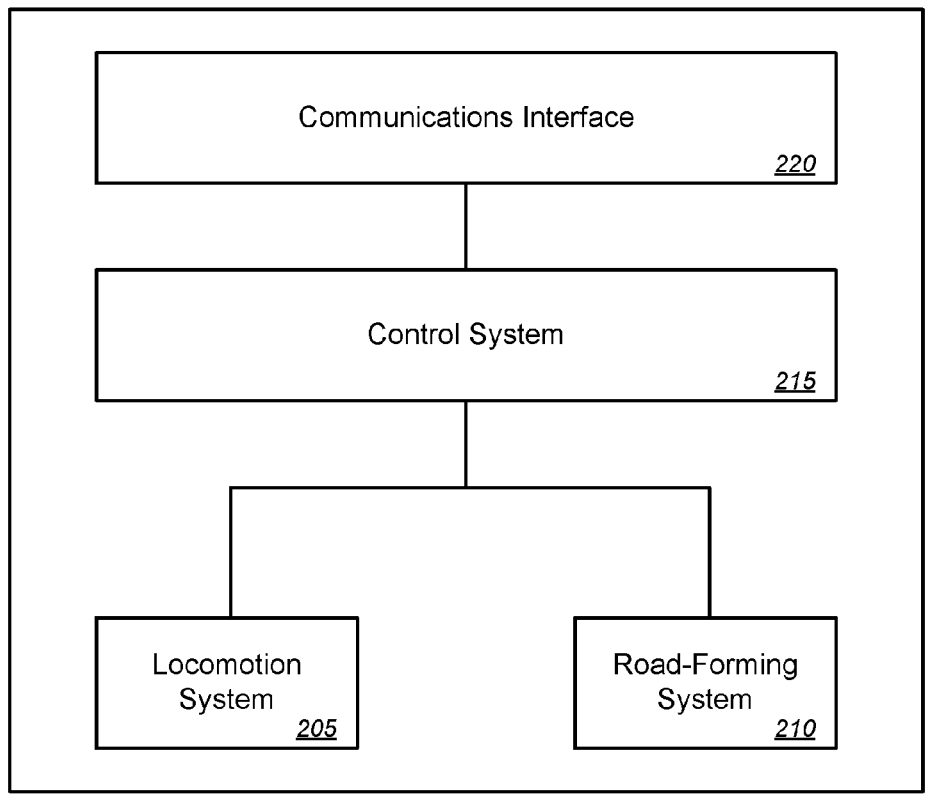
FIG. 2 is a simplified block diagram illustrating a generic road-forming machine, in accordance with various embodiments.

FIG. 2 is a simplified block diagram illustrating a generic road-forming machine 200, in accordance with various embodiments. (It should be noted that, although the description herein generally refers to road-forming machines, embodiments are not so limited, and various embodiments can be used to control any type of vehicle, in including in particular heavy equipment vehicles, which include road-forming machines and other construction equipment, tractors, heavy-duty trucks, and the like.) The generic road-forming machine can represent any suitable type of machine, including without limitation those described above, as well as the specific (but not limiting) examples depicted in FIGS. 3 and 4. The generic machine 200 comprises a locomotion system 205. The locomotion system 205 can include any components that provide movement for the machine 200, including without limitation engine, drivetrain, suspension, wheels, tracks (or other ground-contact components), steering systems and components, braking systems and components, and/or the like. The machine 200 might further comprise a road-forming system 210, which can include any of a variety of tools or components designed to form, shape, move, extrude, compact or otherwise manipulate a ground surface, such as a dirt underbed for a road, a paving material (e.g., concrete, asphalt, etc.).

In an aspect, the machine 200 further comprises a control system 215, which can comprise a special-purpose computer or a programmed general-purpose computer (general examples of which are described below with regard to FIG. 6). The control system 215 communicates with various systems of the machine 200 (including without limitation those described above) and controls the operation of the machine 200, including without limitation the operation of the locomotion system 205 and the road-forming system 210. As noted above, the locomotion system 205 and the road-forming system 210 each can include a variety of components, and the skilled reader should appreciate that and/or each system 205, 210 can perform one or more functions; for instance, the locomotion system 205 perform steering functions, horizontal and/or vertical movement functions, and the like. As used herein, the term "control" (and its derivatives), when applied to controlling such systems, means providing control input for one or more functions performed by one or more components of such a system. Thus, for example, when controlling the locomotion system 205, the control system 215 might provide control input to the locomotion system 205 with regard to forward velocity of the machine 205 based on the techniques described herein, but might not provide control input for a steering function (which might be controlled by an operator), or vice versa.

In some respects, the control system 215 operates in response to operator input, while in other respects, the control system 215 provides automated control over machine 200 operations. In particular embodiments, for example, the control system 215 can be loaded with a design model for the project and can operate the machine 200, largely autonomously, to conform with the design model. In other cases, the control system 215 might involve more user interaction; for example, the control system might accept user input to modify parameters specified by the model to account for site-specific conditions or events, and/or the control system, rather that providing autonomous control over other machine 200 systems, might provide guidance to an operator who manually controls such systems.

The machine 220 can also include a communications interface 220, which might be integrated with the control system 215 or otherwise in communication with the control system 215. The communication interface 220 can include any hardware or software necessary to provide communication between the control system 215 and external devices, such as ports for wired communication (e.g., serial ports, Ethernet ports), wireless radios (e.g., Bluetooth™ radios, 802.11x radios, cellular radios and other standard or proprietary radio frequency (RF) communication radios). In an aspect, the communication interface 220 provides connectivity between the machine 200 (or more precisely, the control system 215) and various data sources, including office computers and field computers (which can be used to upload the project design model to the control system 215) and position-measurement devices, from which the control system 215 can receive position data (e.g., as described in further detail below) to ensure that the as-built project remains consistent with the design model.

It should be appreciated that the machine 200 depicted in FIG. 2 is illustrated, and described, with a high degree of generality, and that a typical road-forming machine will have many other components and systems. The machine 200 is described herein merely for purposes of illustrating the concepts of certain embodiments with regard to controlling a wide variety of road-forming machines, which necessarily will feature different types of systems and components to accomplish various road-forming tasks.

Figure 3:
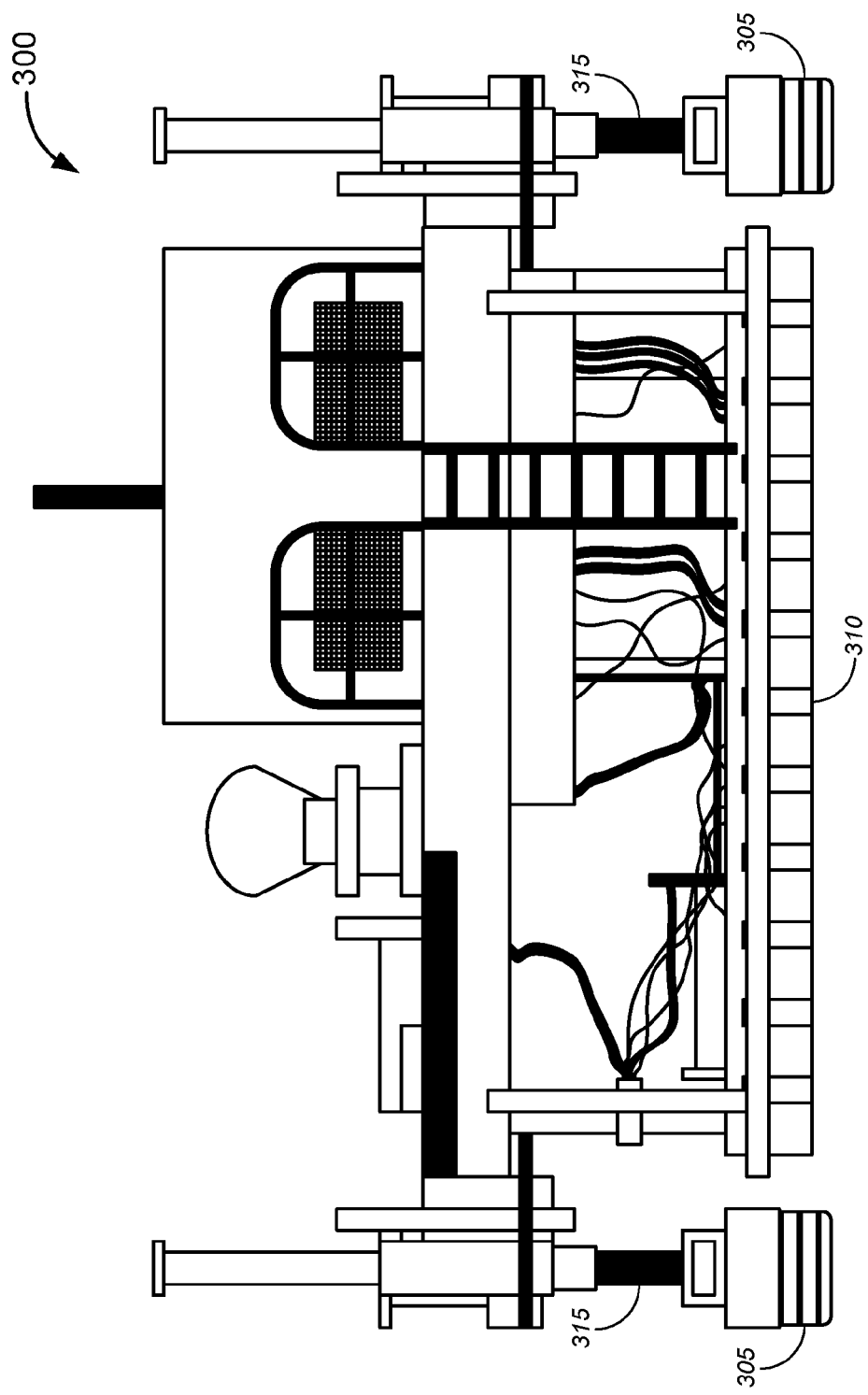
FIG. 3 illustrates a paving machine, in accordance with various embodiments.

For instance, FIG. 3 illustrates a paving machine 300, in accordance with various embodiments, which can be considered one specific type of road-forming machine, which can form a road surface by depositing and/or extruding paving material to form a road surface. The paving machine 300 might be a slipform paver (or "white paver") that extrudes concrete provided by separate vehicles, or it might be an asphalt paver that deposits asphalt from a hopper on the machine 300 itself. In either case, the paving machine might have a locomotion system that comprises a set of tracks 305, which provide locomotion of the machine 300. The paving machine 300 might also comprise a communication interface and/or a control system which are (not illustrated on FIG. 3 but described above with respect to FIG. 2). The control system, for example, can control operation of the locomotion system (including the tracks), for example, by controlling a speed of the tracks and/or steering of the machine through the tracks, in accordance with the techniques described in further detail below.

Additionally, the paving machine 300 might comprise a paving system, which can include apparatus 310 for depositing, extruding, and/or otherwise forming a paving material on a road surface, as well as a set of legs 315 that control a height of the apparatus 310 from the ground surface on which the tracks 305 are situated. The control system can control various aspects of this paving system, for example to set an elevation of the top surface of the paving material, to control the speed at which paving operations are performed, and/or the like.

Figure 4:
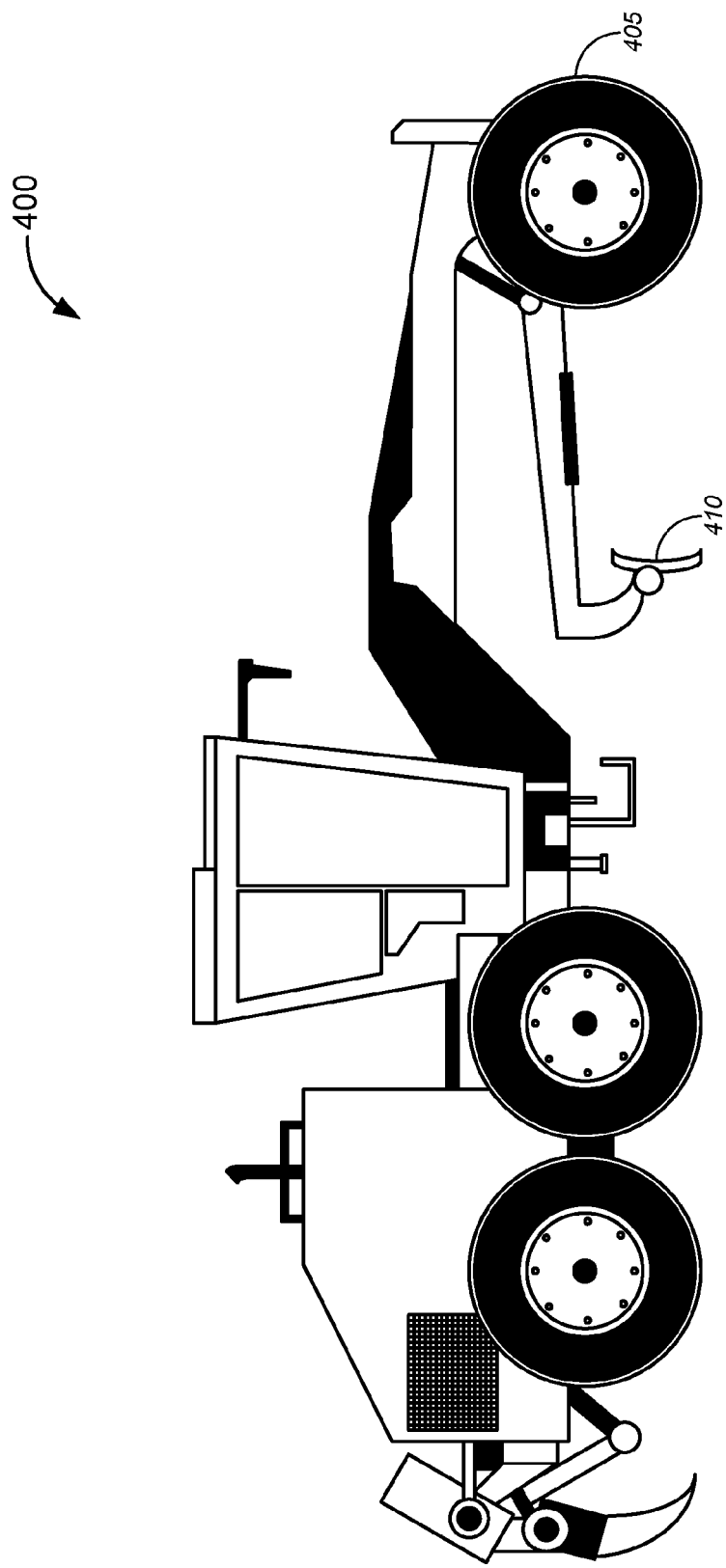
FIG. 4 illustrates a motor grader, in accordance with various embodiments.

FIG. 4 illustrates a motor grader 400, in accordance with various embodiments, which can be considered another example of a road-forming machine, and which can form a road surface, e.g., by removing and/or moving material to form an underbed of the road surface, and/or by moving and/or removing material from the road surface itself. Like the paving machine described above (and all road-forming machines more generally), the motor grader 400 can include a control system and/or a communication interface (not illustrated on FIG. 4), which can function as described above with regard to FIG. 2. The motor grader 400 might also include a locomotion system, which can include wheels 400, as well as an engine, drivetrain, steering system, and/or the like, as well as a road-forming system, which in this case can include a scraper blade 410 and apparatus for orienting the scraper blade 410. Both the locomotion system and the road-forming system can be controlled by the control system, as described above with respect to FIG. 2.

Figure 5:
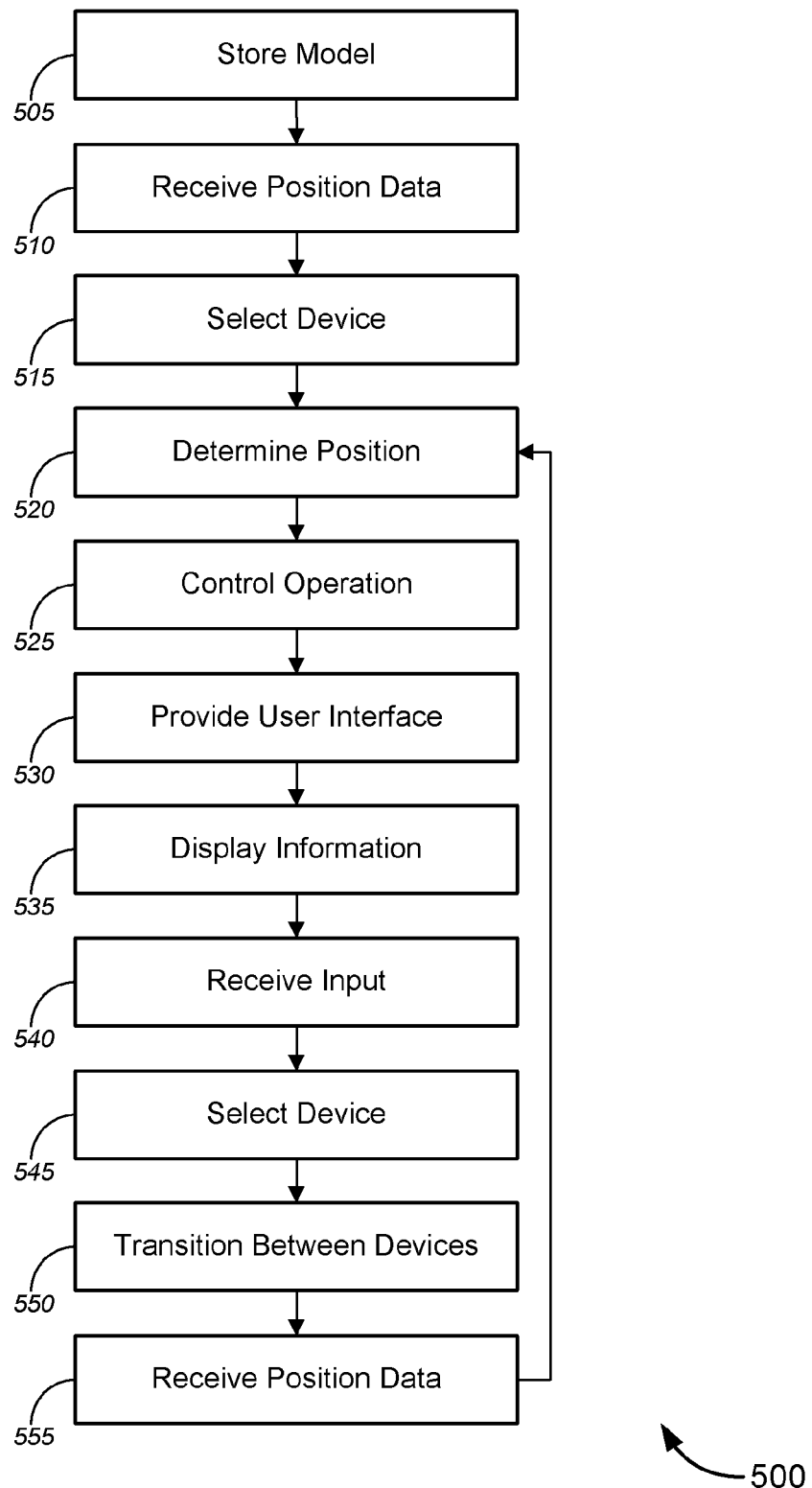
FIG. 5 is a process flow diagram illustrating a method of controlling a road-forming machine, in accordance with various embodiments.

Although FIG. 2 illustrates a road-forming machine in general, and FIGS. 3 and 4 illustrate specific examples of such machines, the skilled reader should understand that embodiments are not limited to these specific examples. Rather, embodiments can include any type of road-forming machine (or any type of machine more generally) that can operate in accordance with the techniques and principles described herein. For example, FIG. 5 illustrates a method 500 of controlling a road-forming machine in accordance with one set of embodiments. While the techniques and procedures of FIG. 5 are depicted and/or described in a certain order for purposes of illustration, it should be appreciated that certain procedures may be reordered and/or omitted within the scope of various embodiments. Moreover, while the method illustrated by FIG. 5 can be implemented by (and, in some cases, are described below with respect to) the systems (including without limitation control systems) and machines illustrated by FIGS. 1-4 (or components thereof), these methods may also be implemented using any suitable hardware implementation. Similarly, while the systems of FIGS. 1-4 (and/or components thereof) can operate according to the methods illustrated by FIG. 1 (e.g., by executing instructions embodied on a computer readable medium), the systems can also operate according to other modes of operation and/or perform other suitable procedures.

The method 500 of FIG. 5 might comprise storing, e.g., in a control system, a design model for a road-forming project (block 505). As noted above, such a model may be created by an office computer, or another appropriate device, and transmitted or otherwise uploaded to the control system of a road-forming machine. (Alternatively, in some embodiments, the control system itself might be used to create or update a design model.) In an aspect, a design model can specify dimensions and positions of project features. Merely by way of example, with regard to a road, the design model might specify latitude and longitude coordinates for edges of the road and an elevation of the crown and/or the edges of the road, with coordinates provided for various points (spaced as frequently as necessary) along the length of the road. Such a model can be stored on a computer readable medium (e.g., by a control system or other device) and can serve as a reference against which the project or a project feature (e.g., a road) is built.

The skilled reader can appreciate that, in order to maintain fidelity to the model, the road-forming machine must maintain an awareness of the position of whatever road-forming system it includes (which generally is a function of the position of a reference point on the machine itself, such as the position of an optical target, a GPS receiver, and/or the like), so that the formed road surface (or under bed, etc.) dimensionally and positionally satisfies the constraints imposed by the model. As noted above, in some cases, the road-forming machine can determine its own position using onboard facilities, but this technique often does not provide sufficient accuracy and/or precision.

Hence, the method 500 can further include receiving (e.g., with a control system of a road-forming machine or other vehicle) position data from two or more position measurement devices (block 510). In some cases, the method 500 will include selecting one of the position measurement devices from which to receive position data and/or to use the received position data (block 515). A variety of techniques can be used to select which position measurement device's data should be used by the control system, as described in further detail below.

The method 500, then, can include determining, at block 520, a first position of the road-forming machine (and/or the road-forming system thereof). In an aspect of some embodiments, such a determination is made based on the position data received from the selected position measurement device. For instance, a particular embodiment, the position measurement device might transmit to the control system a measured position of an optical target (or other reference point) on the road-forming machine, and the control system might be programmed with instructions to derive a position of one or more points of interest on the machine (such as positions, in 3 dimensions, of each endpoint of a bottom surface of a motor grader blade, of each lateral endpoint of an extrusion system or pavement deposition system, and/or the like). Such points of interest might each have a known offset from the reference point, and, as such, the position of each such point can be known in relation to the reference point. Hence, in determining the position of the road-forming machine, the control system might actually determine the position of one or more such points of interest relative to the position of the machine and/or a reference point thereon.

In some embodiments, the method 500 can further comprise controlling operation of the road-forming machine and/or various systems thereof (block 525). More particularly, in some embodiments, the method can include controlling operation of a locomotion system and/or a road-forming system, based on a comparison of positions of the road-forming machine (and/or various points of interest thereof, as described above) with reference points specified by the design model. This comparison can occur continuously and/or periodically (on whatever frequency is appropriate to attain the desired precision of fidelity to the model), and the operation of various systems can be adjusted based on this comparison.

Merely by way of example, in the context of a paving machine, if the model indicates that the road surface should curve beginning at a certain point, when the machine (or more particularly the paving system thereof) reaches that point, the control system might adjust steering of the tracks of the paving machine to produce the curve specified by the model. Similarly, the paving machine might adjust the height of one of more legs that support the paving system to ensure that the formed road surface conforms to an elevation specified by the model at the latitude/longitude coordinates that the control system has determined to be the position of the paving system a given point in time. To use another example, the steering apparatus, wheel speed, and/or blade position/orientation of a motor grader can be controlled by control system to ensure consistency of a graded surface to a model of that surface.

The control system might receive various forms of input and provide various forms of output, other than merely receiving position data and providing control output. For example, the control system might receive user input and/or provide output to a user. Accordingly, in some cases, the method 500 includes providing a user interface to provide for such user interaction (block 530). For example, the user interface can be used to output information for a user, e.g., by displaying the information on a display device, printing information with a printer, playing audio through a speaker, etc.; the user interface can also function to receive input from a user, e.g., using standard input devices such as mice and other pointing devices, motion capture devices, touchpads and/or touchscreens, keyboards (e.g., numeric and/or alphabetic), microphones, etc. In some cases, the user interface might be provided in a cab of the road-forming machine. In other cases, the control system might communicate with a remote device (such as a field computer), and the user interface might be implemented by such a remote device. In any case, the user interface can provide for various types of user interaction.

Merely by way of example, the method 500 can include displaying information with the user interface (block 535). Such information can include a variety of different types of data with regard to the operation and or control of the road-forming machine. For instance, the user interface might display information about operational parameters of the machine and/or the systems thereof, information about the design model and/or the machine's progress in implementing the model.

In a particular aspect, the user interface can display information about any position measurement devices with which the control system can communicate and/or from which the control system can receive position data. Such information can include, without limitation, a distance to each of the position measurement devices from the current position of the machine, information about the location of each of the position measurement devices (which could be presented graphically, e.g., as a map showing the identified position measurement devices and the road-forming machine, and/or texturally, e.g., as positions of each position measurement device expressed in relation to the coordinate system used for the project, such as latitude/longitude/elevation). Such information can also include an identification of which position measurement device(s) currently provide the position data that is being used to determine the position of the machine at that time.

Similarly, the method 500 might comprise receiving input (e.g., at the control system) with the user interface (block 540). Such input can include control input for operation of the road-forming machine, and/or various systems thereof, such as input to begin road-forming operations, to cease road-forming operations, to power up or power down the road-forming machine, to provide manual modification of the steering of wheels or tracks, to provide manual control over a height of one or more legs supporting a paving system, to manually control a position of a motor grader blade, and/or to otherwise provide manual operational control of the machine or any of its systems. Further, as noted below, the control system may be programmed to ensure that the formed road surface has no discontinuities greater than a particular tolerance, and the user interface can receive user input to define such tolerances. For example, the control system might ensure that any such discontinuities do not exceed a vertical and/or horizontal threshold value, the control system might receive user input specifying vertical and/or horizontal threshold values and/or an overall threshold value that should not be exceeded in this regard. As another example of a threshold, the control system might have defined a minimum (or maximum) distance threshold over which discontinuities should be resolved. For instance, a distance threshold could specify the linear distance over which any discontinuity (vertical or horizontal) is absorbed to mitigate surface or alignment discrepancies.

In a particular embodiment, the user-interface can receive user input to specify which position measurement device (of a plurality of identified position measurement devices) should be used by the control system to determine the position of the road-forming machine. Merely by way of example, as noted above, identified position measurement devices can be shown in a list, on a map, and/or the like, with associated information (such as location of each device, the distance from the machine of each device, a signal strength of the signal received by the control system from each device, etc.). The control system may be configured to allow the user to select any such position measurement device as the device to be used to determine the position of the road-forming machine, e.g., by touching an identification of one of the position measurement devices on a touchscreen, scrolling through a list of devices with the cursor, selecting one of the devices with a mouse, and/or the like.

In an aspect, the method 500 might include selecting a new position measurement device (of the plurality of such devices) from which to receive position data (block 545). The control system might use one or more of any of a variety of techniques to select the new position measurement device from which to receive data to determine the position of the machine. Merely by way of example, the control system might merely select a position measurement device that has been specified by user input (e.g., as described above).

Alternatively and/or additionally, the control system might automatically (i.e., without user input) select a new position measurement device based on any of a number of factors. For instance, the control system might select the closest position measurement device, the position measurement device with the strongest signal, and/or the like. In some cases, the control system might take into account the movement of the machine and/or details of the design model to select a new position measurement device. For instance, the control system might select the closest position measurement device in the direction in which the machine is currently traveling, the closest position measurement device to a future position of the machine (as specified by the model), and/or the like. Based on the disclosure herein, the skilled reader will appreciate that the control system could use any of a variety of different decision matrices or algorithms to select a new position measurement device.

The method 500, then, can also include transitioning from the original position measurement device to the selected position measurement device (block 535). In other words, the control system might switch from using data from the original position measurement device to determine the machine's position to using data from the newly-selected position measurement device to determine the machine's position. Once the transition to the selected position measurement device has been performed, the method 500 can include, at block 555, receiving position data from the selected position measurement device (as described above, for example) and can continue from block 520 with determining the position of the machine or vehicle.

As noted above, a novel aspect of some embodiments is the ability to transition from one position measurement device without affecting operation of the road-forming machine. Hence, in some cases, the transition and/or position determination using data from a new position measurement device can be performed without interrupting movement of the road-forming machine or formation of the road surface. Alternatively and/or additionally, this continuous performance of road-forming operations can be accomplished without introducing a discontinuity in the formed road surface greater than a specified threshold value (which might be specified, as noted above, through user input, or which might be specified by the model itself, by default parameters in the control system, and/or the like).

To accomplish such a transition without affecting operations, the control system might use any of a variety of techniques to allow for a smooth transition. Merely by way of example, the control system, for some period of time (or while the machine travels some distance) might receive position data from the original position measurement device and the new position measurement device and/or might determine a blended position solution based on some combination of the data from both devices, in order to minimize any discontinuities in the position solution based on differential error between the position data provided by each respective position measurement device. The Blended Solutions Application, already incorporated herein by reference, describes several techniques (any of which can be employed with the method 500) to determine a blended position solution for the position of the machine at a given point in time.

Figure 6:
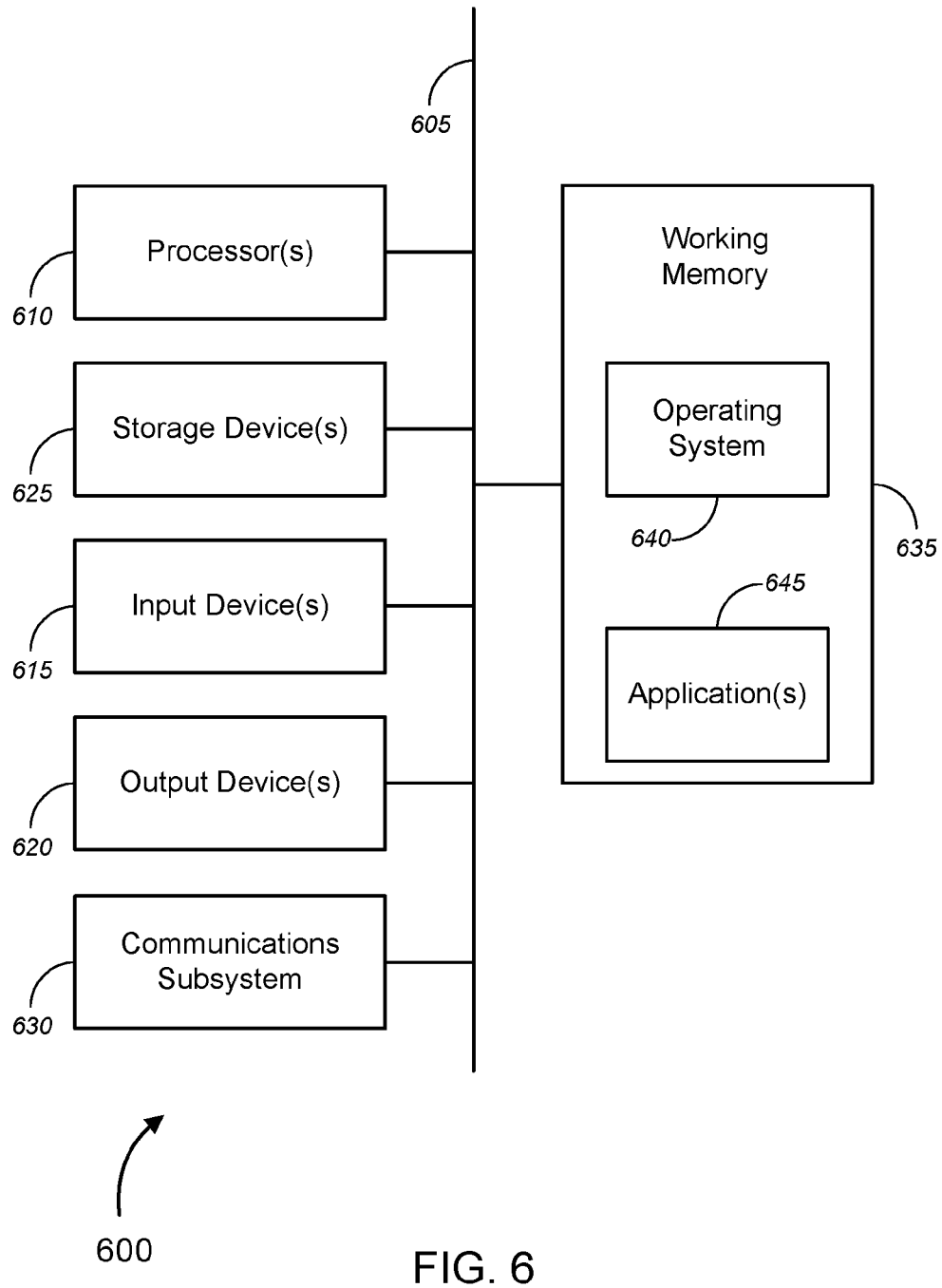
FIG. 6 is a generalized schematic diagram illustrating a computer system, in accordance with various embodiments.

FIG. 6 provides a schematic illustration of one embodiment of a computer system 600 that can perform the methods provided by various other embodiments, as described herein, and/or can function as a control system for a road-forming machine or other vehicle, an office computer, a field computer, a control system for a position measurement device, and/or the like. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard and/or the like; and one or more output devices 620, which can include without limitation a display device, a printer and/or the like.

The computer system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 630 may permit data to be exchanged with a network (such as the network described below, to name one example), with other computer systems, and/or with any other devices described herein. In many embodiments, the computer system 600 will further comprise a working memory 635, which can include a RAM or ROM device, as described above.

The computer system 600 also may comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operation in a specific fashion. In an embodiment implemented using the computer system 600, various computer readable media might be involved in providing instructions/code to processor(s) 610 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 625. Volatile media includes, without limitation, dynamic memory, such as the working memory 635. Transmission media includes, without limitation, coaxial cables, copper wire and fiber optics, including the wires that comprise the bus 605, as well as the various components of the communication subsystem 630 (and/or the media by which the communications subsystem 630 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

While certain features and aspects have been described with respect to exemplary embodiments, one skilled in the art will recognize that numerous modifications are possible. For example, while embodiments are described above with regard to pavers and motor graders, it will be appreciated that the concepts presented here apply equally to a wide variety of heavy and construction equipment, including without limitation any type of equipment that removes or places construction material to high accuracy, such as milling machines, concrete paving machines, slip-form paving machines, and the like. Further, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A heavy equipment vehicle, comprising:
    a locomotion system configured to move the heavy equipment vehicle;
    a tool configured to manipulate a ground surface continuously as the heavy equipment vehicle moves;
    a communication interface to provide communication with a plurality of position measurement devices; and
    a control system comprising a processor, a non-transitory storage medium, and a set of instructions executable by the processor, the set of instructions comprising:
        instructions to receive position data from two or more position measurement devices, including a first position measurement device and a second position measurement device;
        instructions to control operation of the tool based on determined positions of the tool and a model stored on the non-transitory storage medium;
        instructions to determine a first position of tool based on position data received from the first position measurement device;
        instructions to transition from the first position measurement device to the second position measurement device without interrupting movement of the heavy equipment vehicle or manipulation of the ground surface and without introducing a discontinuity in the manipulated ground surface greater than a specified threshold value; and instructions to determine a second position of the tool based on position data received from the second position measurement device.

2. The heavy equipment vehicle of claim 1, wherein the set of instructions further comprises instructions to provide a user interface for the control system.

3. The heavy equipment vehicle of claim 2, wherein the set of instructions further comprises instructions to display, on the user interface, information about the two or more position measurement devices.

4. The heavy equipment vehicle of claim 3, wherein the information about the two or more position measurement devices comprises a distance to each of the two or more position measurement devices.

5. The heavy equipment vehicle of claim 3, wherein the information about the two or more position measurement devices comprises a location of each of the two or more position measurement devices.

6. The heavy equipment vehicle of claim 3, wherein the information about the two or more position measurement devices indicates which of the two or more position measurement devices are providing position data used to determine a current position of the tool.

7. The heavy equipment vehicle of claim 3, wherein the set of instructions further comprises instructions to receive, through the user interface, input indicating which of the two or more position measurement devices should be used to determine a current position of the tool.

8. The heavy equipment vehicle of claim 2, wherein the set of instructions further comprises instructions to receive, through the user interface, input specifying the threshold value.

9. The heavy equipment vehicle of claim 8, wherein the input specifies a horizontal threshold.

10. The heavy equipment vehicle of claim 8, wherein the input specifies a vertical threshold.

11. The heavy equipment vehicle of claim 8, wherein the input specifies a distance threshold that defines a linear distance over which any discontinuity is absorbed.

12. The heavy equipment vehicle of claim 1, wherein the set of instructions comprises instructions to select one or more of the two or more position measurement devices from which to receive position data.

13. The heavy equipment vehicle of claim 1, wherein the heavy equipment vehicle is a tractor.

14. The heavy equipment vehicle of claim 13, wherein manipulating a ground surface comprises forming the ground surface.

15. The heavy equipment vehicle of claim 13, wherein manipulating a ground surface comprises moving the ground surface.

16. The heavy equipment vehicle of claim 13, wherein manipulating a ground surface comprises compacting the ground surface.

17. The heavy equipment vehicle of claim 13, wherein the tool comprises a scraper blade, and wherein set of instructions further comprises instructions to orient the scraper blade.

18. The heavy equipment vehicle of claim 13, wherein the locomotion system comprises a plurality of tracks, and wherein controlling operation of the locomotion system comprises controlling steering of one or more of the tracks.

19. The heavy equipment vehicle of claim 18, wherein the set of instructions further comprises instructions to receive, through a user interface, input to manually modify a steering of one or more of the tracks.

20. The heavy equipment vehicle of claim 1, wherein manipulating the ground surface comprises removing material from the ground surface.

21. The heavy equipment vehicle of claim 1, wherein the set of instructions further comprises instructions to control operation of the locomotion system.

22. A control system for a heavy equipment vehicle, the control system comprising:
one or more processors; and
a non-transitory computer readable medium in communication with the one or more processors, the computer readable medium having encoded thereon a set of instructions executable by the computer system to:
receive position data from two or more position measurement devices, including a first position measurement device and a second position measurement device;
control operation of a locomotion system of the heavy equipment vehicle and a tool of the heavy equipment vehicle to manipulate a ground surface continuously, based on determined positions of the tool and a model stored on the non-transitory computer readable medium;
determine a first position of the tool based on position data received from the first position measurement device;
transition from the first position measurement device to the second position measurement device without interrupting movement of the heavy equipment vehicle or manipulation of the ground surface and without introducing a discontinuity in the ground surface greater than a specified threshold value; and
determine a second position of the tool based on position data received from the second position measurement device.

23. A method, comprising:
manipulating a ground surface with a heavy equipment vehicle, the heavy equipment vehicle comprising:
a locomotion system configured to move the heavy equipment vehicle;
a tool configured to manipulate a ground surface continually as the heavy equipment vehicle moves;
a communication interface to provide communication with a plurality of position measurement devices; and
a control system configured to control operation of the heavy equipment vehicle;
receiving, with the control system, position data from two or more position measurement devices, including a first position measurement device and a second position measurement device;
controlling, with the control system, operation of the locomotion system and the tool based on determined positions of the tool and a model stored on the non-transitory storage medium;
determining, with the control system, a first position of the tool based on position data received from the first position measurement device;
transitioning, with the control system, from the first position measurement device to the second position measurement device without interrupting movement of the heavy equipment vehicle or manipulation of the ground surface and without introducing a discontinuity in the manipulated ground surface greater than a specified threshold value; and determining a second position of the tool based on position data received from the second position measurement device.

* * * * *